United States Patent [19]

Cislak

[11] 4,149,918
[45] Apr. 17, 1979

[54] METHOD AND APPARATUS FOR PRODUCING SAFETY BELTS WITH REDUCED KERFS

[75] Inventor: Raymond S. Cislak, Chicago Heights, Ill.

[73] Assignee: Gateway Industries, Inc., Chicago, Ill.

[21] Appl. No.: 819,672

[22] Filed: Jul. 28, 1977

[51] Int. Cl.² .......................... B23K 9/00; B29C 27/02
[52] U.S. Cl. .......................... 156/88; 156/82; 156/251; 156/272; 156/380; 156/497; 156/499; 156/515; 219/121 L; 219/121 LM
[58] Field of Search .................. 156/82, 88, 272, 251, 156/250, 267, 497, 499, 515, 510, 380; 219/121 L, 121 LM

[56] References Cited

U.S. PATENT DOCUMENTS

| | | | |
|---|---|---|---|
| 3,322,584 | 5/1967 | Welin-Berger | 156/88 |
| 3,560,291 | 2/1971 | Foglia et al. | 156/380 X |
| 3,582,466 | 6/1971 | Quirk | 162/286 |
| 3,612,814 | 10/1971 | Houldcroft | 219/121 L |
| 3,614,369 | 10/1971 | Medley | 219/10.43 |
| 3,856,599 | 12/1974 | Bylund | 156/250 X |
| 3,870,852 | 3/1975 | Kogert | 219/121 LM |
| 3,932,726 | 1/1976 | Verheyen et al. | 219/121 LM |
| 3,953,706 | 4/1976 | Harris et al. | 219/121 L |
| 3,965,327 | 6/1976 | Ehlscheid et al. | 219/121 LM |
| 4,039,799 | 8/1977 | Stumpf | 219/121 L |

*Primary Examiner*—Michael G. Wityshyn
*Attorney, Agent, or Firm*—Fitch, Even & Tabin

[57] ABSTRACT

This invention relates to a method and apparatus for reducing the sizes of the kerfs of safety belts made from severed webs of woven synthetic filaments such as polyamide or polyester filaments. In the preferred method, a laser beam sweeps across the belt to vaporize some of the belt material and severs the same. Preferably, all four sides of the belt are confined as by means of a clamping pressure to restrict the growth or expansion of the filaments in the direction outwardly of the sides of the belt. The preferred apparatus has means for feeding the webs to the severing station and means for actuating the clamp into clamping engagement to confine the belts as well as a discharge feed means for discharging the severed belts from the severing station.

11 Claims, 8 Drawing Figures

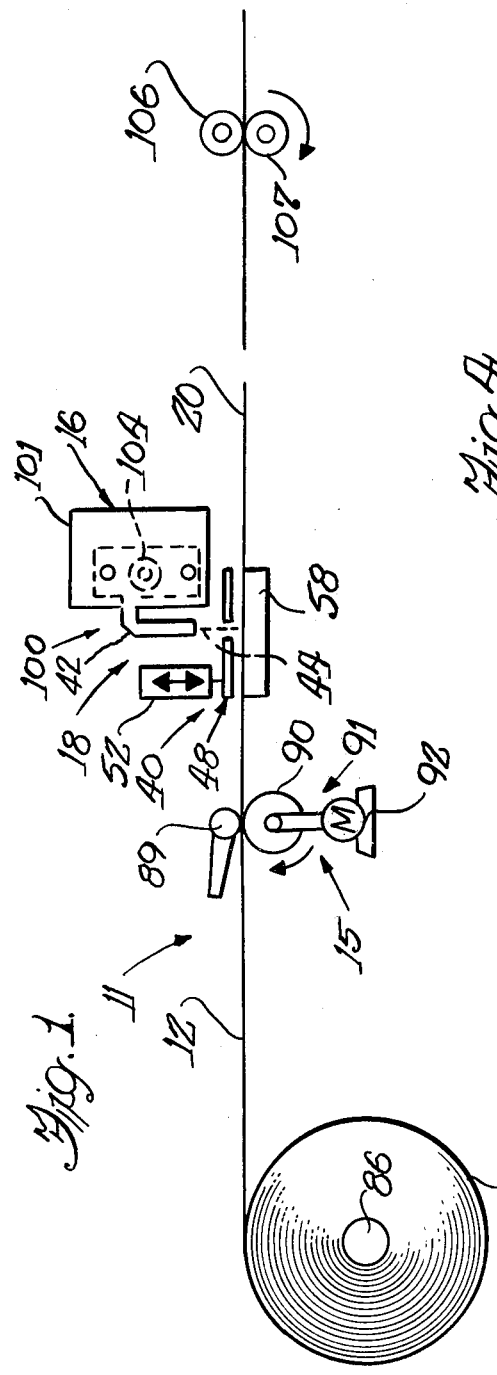
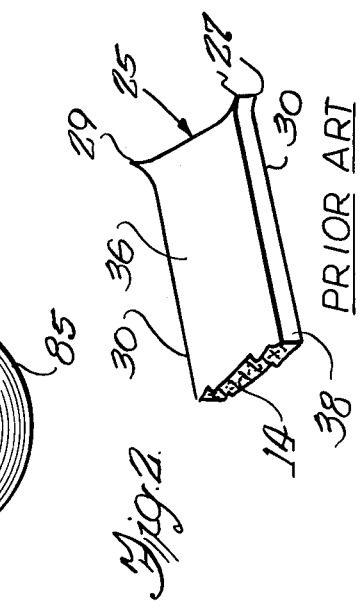
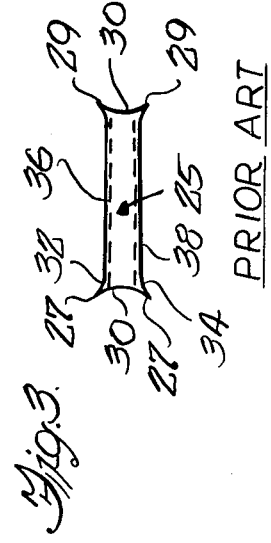
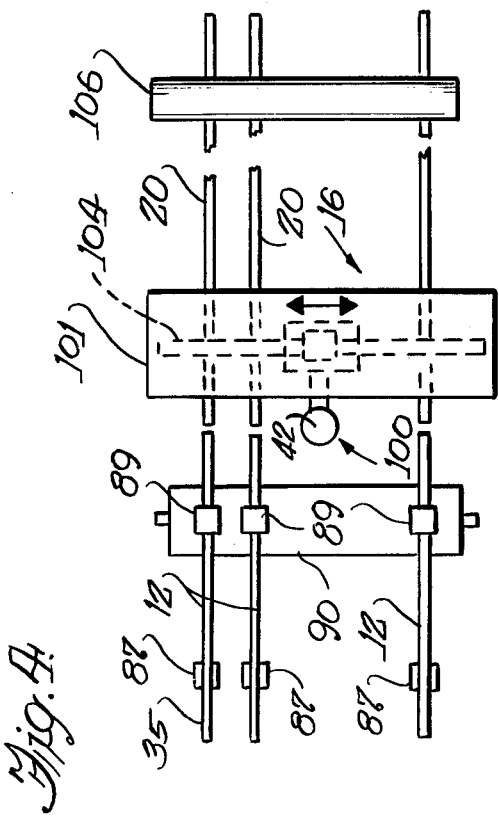

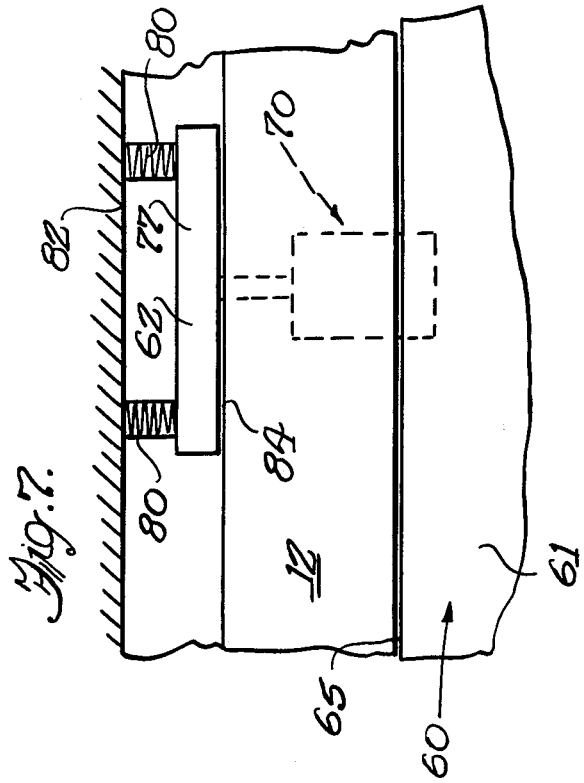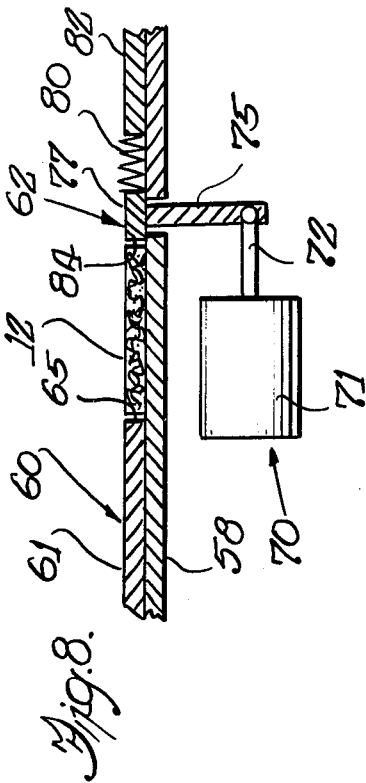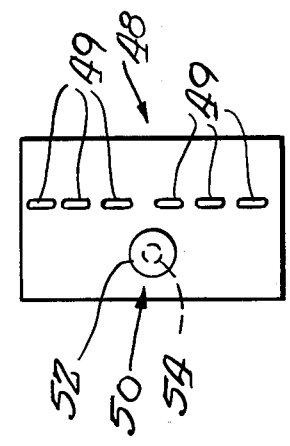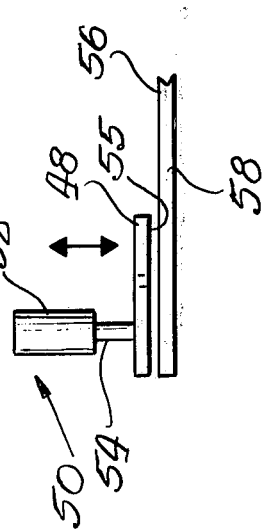

METHOD AND APPARATUS FOR PRODUCING SAFETY BELTS WITH REDUCED KERFS

This invention relates to a method and apparatus for reducing the ragged edge and corners formed when severing synthetic fiber webs into individual lengths of safety belts.

The present invention is directed to the reduction of the size of the kerf of a seat belt and particularly to reducing substantially the size of the corners formed as a long belt web is severed into individual segments for later use as seat or shoulder straps in a seat belt system for a vehicle. Typically, these safety belt webs are formed of woven synthetic fibers usually a polyamide material such as nylon or in some instances a polyester material. These seat belts are required by the federal safety laws to have the individual woven filaments at kerfs fused together to provide an end which is resistant to unraveling, particularly when subjected to high tensile pull tests.

Often the seat belt is joined to a buckle tip or tongue plate by means of a folded length of belt inserted through an aperture in the buckle tip. The folded length is secured usually by a butterfly stitching and with a stitch extending laterally across the kerf. As will be familiar to those skilled in the art, the corners of the kerf extend laterally or transversely outwardly as well as upwardly from the belt fold providing sharp points. Typically, the tongue plate is located at the hip of the wearer in a three point safety belt system. In some instances, these corners of the kerf will snag the clothes of the wearer, particularly the fine knit suits or fabrics worn by women. In addition to the outward projecting corners on the kerf, the act of cutting the web by a hot knife also results in an increased thickness of the web leaving upper and lower hard transverse edges projecting outwardly from the flat planar longitudinal surfaces of the belt.

The present commercial practice for severing the belts is to sever a plurality of woven synthetic filament webs simultaneously by a hot cutting knife blade which moves downwardly to engage the upper surfaces of the stationary belts and by means of heat and pressure forces its way through filaments severing the same and forcing the molten plastic laterally outward. The heat and pressure fuses the individual filaments to each other to prevent their unraveling. The heat and pressure of the knife blade simultaneously forces the plastic material laterally outwardly of the longitudinally extending sides of the belt and forms sharp corners for the kerf. These corners are further enhanced in the thickness and strength by the molten plastic material which was being forced upwardly and downwardly by the hot knife. Typically, the hot knife forms a kerf in which a total lateral thickness of the web is increased by about 0.040 to 0.060" in width from a nominal 1-15/16 inch width. In the vertical thickness direction, the total increase in thickness is generally about 0.040 to 0.045" for a web which is about 0.045 to 0.060 inch in thickness. The corners formed thus become enlarged and very hard and rather sharp points which, in some instances, snag clothing of the user. Millions of seat belts have been made in this manner. A need exists for a method of reducing the size of the kerf for such safety belts.

Accordingly, a general object of the present invention is to provide a new and improved method and apparatus for severing safety belts from a web of woven synthetic filaments or fibers.

A further object of the invention is to reduce substantially the size of the kerfs particularly at the corners formed when safety belts are severed from long webs of woven synthetic filaments.

Other objects and advantages of the invention will become apparent from the following detailed description taken in connection with the accompanying drawings in which:

FIG. 1 is a diagrammatic elevational view of an apparatus for practicing a preferred method of the invention.

FIG. 2 is a diagrammatic view of a prior art kerf formed by a hot knife cut.

FIG. 3 is an end view of the kerf of FIG. 2.

FIG. 4 is a plan view of an apparatus for practicing the preferred method of the invention.

FIG. 5 is an elevational view of a clamp for clamping the top side of the belt.

FIG. 6 is an elevational view of the clamping means of FIG. 5.

FIG. 7 is a plan view of a side clamping means; and

FIG. 8 is a partially sectioned view of the side clamping means of FIG. 7.

As shown in the drawings for purposes of illustration, the invention is embodied in a method and an apparatus 11 for moving one or more webs 12 of woven filaments 14 by a feeding means 15 past a severing station 16 at which a severing means 18 at the severing station severs an individual segment or safety belt 20 from each one of a series of webs 12 forming cut ends or kerfs 25, i.e., the severed end of the belt.

Heretofore, the severing means at the severing station has been a hot knife which operates at about 900° F. to 950° F. The control and adjustment of the heat of the knife is delicate and involves expensive control equipment. Further, the hot knife blades tend to become coated with plastic after considerable usage; and it is necessary to either brush the hot plastic from the knife or to replace the blade. Further, sometimes the hot plastic accumulates on the knife blades and then breaks loose and transers from the knife to the belt forming a very large kerf. In a hot knife severing station, the webs are supported on their bottom sides by a metal plate and the knife moves down through the webs into engagement with the metal plate during the severing operation.

The kerf 25 for a safety belt which is formed by severing with a hot knife has sharp corners 27 and 29 at opposite sides of the belt which project laterally outwardly of the longitudinally extending sides 30 of the belt. The total lateral increase in width is usually about in the range of 0.040 to 0.060 inch with each corner having an outward projection of about 0.020 to 0.030 of an inch. These corners are extremely hard having been formed from molten plastic, either polyamide or a polyester, which was pushed outwardly by the hot cutting knife. Often the corners are very sharp when formed by a hot knife. Also, as diagrammatically illustrated in FIG. 3, the kerf is increased in the thickness in a vertical direction between its upper edge 32 and its lower edge 34 by molten plastic having been forced upwardly and downwardly by the hot knife. This increased thickness is usually about 0.040 to 0.045 inch greater than the nominal belt thickness between upper and lower flat sides 36 and 38 for the belt. It is the combined increase in lateral width and in thickness caused by the molten material which results in the enlarged kerf corners 22 and 29 which tend to snag onto clothing and a total size for the kerf that is desired to be reduced.

In accordance with the present invention, these sharp corners and the size of the kerfs 25 are substantially reduced by severing the webs 12 with a severing means 18 which vaporizes the web material to form the cut and by confining the web at the location of the cut. The ends of the filaments are fused against unraveling and meet the desired safety standards. The confining of the belt preferably includes clamping or confining of the sides of the belt by a clamping means 40 which limits the growth of the molten filament ends in the transverse and vertical directions during the vaporization. As will be explained in greater detail, the preferred vaporization is by means of a CO2 laser 42 which emits a beam 44 which traverses the series of webs 12 to cut each of them as the beam traverses a path across the apparatus 11.

Referring now in greater detail to the illustrated embodiment of the invention, the preferred clamping means 40 for restricting the growth of the molten material as would increase the size of the kerf 25 is shown. The illustrated clamping means 40 includes an upper or holddown plate 48 which has a series of mask-like apertures 49 therein, each of which is aligned to receive therethrough the laser beam. The holddown plate 48 is preferably shifted vertically from an upper release position to a lowered clamping position by an actuating means 50. Herein, the actuating means 50 comprises a fluid actuated cylinder 52 having a piston rod 54 connected at its lower end to the holddown plate 48 for shifting the same vertically between its upper release position at which the holddown plate is spaced from the top surface of the webs 12 to a downward clamping position at which its underside 55 engages the top surfaces 36 of the webs 12 and forces the lower sides 38 of the webs tightly against the upper surface 56 of a lower supporting plate 58 of aluminum. The lower supporting plate 58 and the holddown plate thus confine or clamp therebetween the upper and lower sides of the webs with only the narrow slits or slots exposing an unconfined area of the webs for the laser beam 44. Herein, the plates 48 and 58 are flat and of metal such as aluminum. The length and width of the apertures 49 may be varied; but apertures 49 generally are in the range of 0.015 to 0.020 inch and are generally defined as fine slits having a length slightly longer than the width of a web.

Although the individual holddown plates each having a mask aperture therein could be used, it is preferred to provide a common flat holddown plate 48 having a series of apertures aligned in a straight line path for the laser beam 44 to pass through in seriatim fashion as the laser beam moves across the series of webs, there being six webs in this illustrated embodiment of the invention.

The illustrated clamping means 40 also clamps and confines the opposite longitudinally extending sides 30 of the webs 12 during the vaporization of the web material by the laser beam 44 to reduce the size of the kerf 25 from that formed by a hot knife cut. Preferably, each of the webs 12 is clamped on its sides individually because the width of the respective ones of the belts may vary by as much as 1/16 inch. As best seen in FIGS. 7 and 8, the illustrated side clamping is obtained between a first stop means 60 which is in the form of stationary sidestop plate 61 secured to the underlying plate 58 and a movable guide or stop means 62 slideable across the top surface of the underlying plate to force the web 12 to abut the other stop means 60. A longitudinally and vertically extending wall 65 on the side stop plate 61 may be engaged by a long side portion of the belt 12 as it is fed forwardly to a position beneath the laser beam path. The movable stop means 62 is shifted from a released position spaced from the web 12 by an actuating means 70 preferably including springs 80 and comprising a fluid actuated cylinder 71 have an extendible piston 72 connected to a depending portion 75 of a slideable flat plate 77 which slides on the top of the underlying plate 58.

To compensate for variations in width of the webs, it is preferred that the slideable plate 77 be biased as by a pair of compression springs 80. Herein, the springs 80 have first ends abutting a stationary wall 82 and their other ends abutting one side of the slideable plate 77. The other side wall 84 of the slidable plate abuts the side 30 of the web and takes up the tolerances present and slides the web laterally to abut the other side wall 30 of the web against the fixed stop surface 65. Thus, when the laser beam 44 vaporizes the web, the opposite sides 30 of the web will be confined and clamped between the stop wall surfaces 65 and 84 and this aids in reducing the amount of growth of the kerf 25 in the lateral direction. After severing, the piston 72 is extended to slide the slideable plate 77 to its release position against the urging of the springs 80.

Thus, it will be seen that the webs may be confined during severing although the width of the belt may vary by as much as plus or minus 1/16th of an inch. Herein, the usual width of the automobile safety belt is 1-15/16ths of an inch in width although a small percentage of seat belts are a nominal two inches in width. The thickness of the belts generally is about 0.040 to 0.060 of an inch.

Referring now to the feeding of the webs 12 and the severed safety belts 20, the webs 12 are each fed from a wound coil 85 (FIGS. 1 and 4) of webbing mounted for turning on a suitable axis 86 of a support means 87. Each of the webs 12 is fed forwardly through the nips formed by upper pinch rollers 89 and lower driven roller 90 to the severing station 16 at which is located the laser 42. The lower feed roller 90 is a large diameter metallic surfaced roller having a very hard surface. The feed roller 90 is driven by a motor drive means 91 which includes a motor 92. The driving nip is maintained to feed the webs 12 for a predetermined distance as measured either by the rotations of the driving roller 90 or by the leading end of the web intersecting the beam of a photocell (not shown).

By way of example, the preferred laser may be a sealed tube laser available from Coherent Radiation of Palo Alto, California. Good test results have been obtained using such a laser model 275 having a vacuum level of 19.6 TOR; focal lenses of 2.4"; a laser medium of 4.5% CO2, 13.5% N2, and balance helium; and a power setting of 275 watts. The laser was running at 275 watts of power and a cut of about 6 to 8 inches per second. No assistance to the laser beam was used other than the confining or clamping means.

The illustrated laser 42 includes a movable head 100 which is suitably guided within a frame 101 and raverses along a rectilinear path as moved by the turning of a ball screw 104. Such a laser system is available from Coherent Radiation of Palo Alto, Calif. Herein, the laser head 100 travels laterally across the six belts and then is stopped while the belts are unclamped and fed forwardly by a pair of discharge feed rollers 106 and 107 which discharge the severed belts. Then the feed nip between the driving roller 90 and the pinch rollers 89 is again made to feed forwardly the six webs until they have been fed forwardly the desired length at which time the web movement is stopped. In this embodiment of the invention, the laser cut is made while the webs are stationary. On the other hand, it is possible to have the laser continuously moving so as to cut on the fly. Further, it may be possible to merely move the laser beam rather than moving the entire laser head 100 as in the illustrated embodiment of the invention. Herein, the cycle time for the laser head to traverse across the six head belts is about four seconds. The laser cuts as it travels in both directions of its travel.

In accordance with the present invention, it has been found that the buildup of corners 27 and 29 in the lateral direction may be contained to about 0.010" in total thickness as contrasted with 0.40 to 0.60 inch buildup with a hot knife cutting system. In the thickness direction, the buildup has been reduced to a total of about 0.007" on the average in contrast to the usual 0.40 or 0.45" when using the hot knife system of the prior art.

From the foregoing, it will be seen that the present invention provides an improved reduced size of kerf and provides an improved manner for severing belts. The apparatus and method are suitable for fast production speeds and result in a superior product.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A method of manufacturing safety belts with reduced sizes of kerfs particularly at the corners thereof, comprising the steps of feeding at least one woven web of synthetic filaments forwardly to a severing station to sever a safety belt therefrom, confining the woven web along the top and bottom and lateral sides of the web adjacent the severing location and on both sides thereof to restrict the expansion of the melted filaments particularly at the corners of said kerfs, vaporizing the synthetic filaments to sever the same at the severing location and to fuse and seal the ends thereof together to prevent unraveling of said filaments at said kerf, releasing the confined belt for discharging the severed safety belt, and feeding the web forwardly again to bring a next portion thereof into position for severing to form another safety belt.

2. A method in accordance with claim 1 in which said step of confining said web comprises moving side clamps from a non-clamping position into clamping engagement with the sides of the web to exert compressive forces to the sides of the web.

3. A method in accordance with claim 1 in which the step of confining of the web comprises moving a top and bottom clamping means from a non-clamping position to a clamping position to exert clamping pressure on the top and bottom sides of the web and exerting clamping pressure on the opposite lateral sides of the web whereby compressive forces are provided on all four sides of the web.

4. A method in accordance with claim 1 in which the step of vaporizing the synthetic filaments comprises directing a laser beam through a slit onto the web.

5. A method in accordance with claim 4 including the further step of traveling a laser beam transversely across a plurality of webs to sever a plurality of safety belts with a single sweep of the laser beam.

6. An apparatus for manufacturing safety belts with reduced sizes of kerfs particularly at the corners thereof comprising:
   means for feeding at least one woven web of synthetic filaments forwardly to a severing station to sever a safety belt therefrom,
   means for confining the top and bottom and opposite longitudinal side edges of said woven web adjacent the severing location and on both sides thereof to restrict the expansion of the melted filaments,
   means for vaporizing the synthetic filaments to sever the same at the severing location and to fuse and seal the ends thereof together to prevent unraveling of said filaments at said kerf with said confining means limiting the upward and downward and lateral growth of the synthetic filaments as the latter cool and form corners for said kerf,
   means for releasing the confined belt for discharging the severed safety belt, and means for feeding the web forwardly again to bring a next portion thereof into position for severing to form another safety belt.

7. An apparatus in accordance with claim 6 in which said means for confining said web comprises side clamps movable toward said web to exert a laterally directed compressive force on said sides of said web and movable away therefrom to allow feeding of said web.

8. An apparatus in accordance with claim 6 in which said means for confining comprises means for clamping the top and bottom sides of the web and for exerting a compression force on said top and bottom sides of the web and means for clamping the opposite lateral side edges of the web to exert a compressive force on the lateral side edge of said web, and means for moving said clamping means to and from positions for clamping.

9. An apparatus in accordance with claim 6 in which said means for vaporizing comprises a laser for generating a beam for traversing the web.

10. An apparatus in accordance with claim 9 in which said feeding means feeds a plurality of webs simultaneously and in which said laser has a beam for sweeping across the entire plurality of webs to cut them in a single sweep of the laser beam.

11. An apparatus for manufacturing safety belts with a reduced kerf particularly at the corners thereof, said apparatus comprising means for feeding a plurality of woven webs of synthetic filaments fowardly to a severing station to sever a safety belt from each of said webs, means for terminating said feeding of the webs after a predetermined length has been fed, clamping means for clamping the top and bottom and lateral side edges of the webs adjacent the severing location and on both sides thereof, a laser means for generating a laser beam for vaporizing the synthetic filaments to sever the same at the severing station and to fuse the ends of filaments together to prevent unraveling of the same at the kerfs, said clamping means exerting a compressive force on the four sides of each said web at said kerf to limit growth of the fused filaments particularly at the corners of said kerf, and means for transporting the severed safety belts from said severing station.

* * * * *